(12) United States Patent
Koide (10) Patent No.: US 7,398,850 B2
(45) Date of Patent: Jul. 15, 2008

(54) TRANSPORT APPARATUS

(75) Inventor: Hiroyuki Koide, Inuyama (JP)

(73) Assignee: Daifuku Co., Ltd., Osaka (JP)

( * ) Notice: Subject to any disclaimer, the term of this patent is extended or adjusted under 35 U.S.C. 154(b) by 507 days.

(21) Appl. No.: 11/199,575

(22) Filed: Aug. 8, 2005

(65) Prior Publication Data

US 2006/0032685 A1    Feb. 16, 2006

(30) Foreign Application Priority Data

Aug. 11, 2004    (JP)    ............... 2004-234281

(51) Int. Cl.
*B60T 7/16*    (2006.01)
(52) U.S. Cl. .............. 180/168; 700/112; 701/301
(58) Field of Classification Search ......... 180/167–169; 414/402; 700/112, 113; 701/123, 301
See application file for complete search history.

(56) References Cited

U.S. PATENT DOCUMENTS

| | | | | |
|---|---|---|---|---|
| 4,465,155 A | * | 8/1984 | Collins | 180/169 |
| 4,783,618 A | * | 11/1988 | Artrip | 318/587 |
| 5,118,191 A | * | 6/1992 | Hopkins | 356/368 |
| 5,164,648 A | * | 11/1992 | Kita et al. | 318/587 |
| 5,245,335 A | * | 9/1993 | Hill et al. | 340/941 |
| 5,399,531 A | * | 3/1995 | Wu | 700/112 |
| 5,424,726 A | * | 6/1995 | Beymer | 340/902 |
| 5,678,974 A | * | 10/1997 | Murano et al. | 414/362 |
| 5,845,725 A | * | 12/1998 | Kawada | 180/167 |
| 6,049,745 A | * | 4/2000 | Douglas et al. | 701/23 |
| 6,122,561 A | * | 9/2000 | Chandler et al. | 700/115 |
| 6,592,080 B2 | * | 7/2003 | Murata et al. | 246/1 C |

FOREIGN PATENT DOCUMENTS

JP    2003-267518    9/2003

* cited by examiner

*Primary Examiner*—Christpher Ellis
*Assistant Examiner*—Vaughn T Coolman
(74) *Attorney, Agent, or Firm*—The Webb Law Firm (57) ABSTRACT

A transport apparatus including: a travel route having a plurality of retrieval locations continuous with the route; a plurality of article transporting vehicles that move along the route; control means for managing the vehicles; connecting means that can connect one of the vehicles to a fixed portion provided near each of the retrieval locations, and is provided with connection detection means that detects whether one of the vehicles and the fixed portion are connected. Each vehicle is provided with connected members that are capable of connecting to the connecting means; vehicle-side communication means for communicating with control-side communication means provided in the control means; a detachable member that can be attached to and detached from each vehicle; and a coupled portion that can be coupled with the detachable member of another vehicle, and is provided with coupling detection means that detects whether or not the detachable member of another vehicle has been coupled thereto.

7 Claims, 4 Drawing Sheets

ly connecting one of the article transporting vehicles to a fixed portion provided near the retrieval location, the connecting means provided with connection detection means for detecting whether or not one of the article transporting vehicles and the fixed portion are connected. Each article transporting vehicle is provided with: connected members that are capable of connecting to the connecting means; vehicle-side communication means for communicating with control-side communication means provided in the control means; a detachable member that can be freely attached to and detached from each of the article transporting vehicles; and a coupled portion that can be coupled with the detachable member of another article handling vehicle, and that is provided with coupling detection means for detecting whether or not the detachable member of another article transporting vehicle has been coupled thereto. The control means manages the plurality of article transporting vehicles through communication between the control-side communication means and the vehicle-side communication means. The control means, based on information detected by the connection detection means and information detected by the coupling detection means, determines that all of the plurality of the article transporting vehicles are allowed to move along the travel route in the case of a first state, in which the detachable member of one article transporting vehicle is not coupled to the coupled portion of any of the other article transporting vehicles, and the connecting means is not connected to the connected member of any of the article transporting vehicles; and determines that article transporting vehicles other than those vehicles that are positioned in the retrieval locations are allowed to move along the travel route in the case of a second state, in which the connecting means is connected to the connected member of the article transporting vehicle that is positioned in the retrieval location, and the detachable member of the article handling vehicle that is positioned in the retrieval location is coupled to the coupled portion of another article transporting vehicle.

TRANSPORT APPARATUS

BACKGROUND OF THE INVENTION

The present invention relates to transport apparatuses, and more specifically relates to improvements to transport apparatuses that have a plurality of transporting vehicles.

Conventional transport apparatuses have been provided with a plurality of article transporting vehicles that move along a shared travel route, control means for managing those transport vehicles, and connecting means that can connect an article transporting vehicle that is positioned at an retrieval location, which is removed from the travel route, and a station of the retrieval location. The connecting means includes connection detection means for detecting whether or not an article transporting vehicle is connected to a station of the retrieval location. Each of the article transporting vehicles is provided with a connected member that is capable of connecting to the connecting means, and vehicle-side communication means that is capable of communicating with optical transmission-type control-side communication means provided in the control means. The control means manages the movement of the plurality of article transporting vehicles through communication between the control-side communication means and the vehicle-side communication means.

Transport apparatuses such as these are employed in automated warehouses, for example. In such an instillation, the control means controls the plurality of article transporting vehicles through communication between the control-side communication means and the vehicle-side communication means and moves them back and forth over a single travel route, in the process using the plurality of article transporting vehicles to transport articles to and from a plurality of article transferring locations that are provided along the travel route.

With such transport apparatuses, if some of the plurality of article transporting vehicles are to be moved to an retrieval location that is continuous with the travel route in order to perform maintenance work or due to technical difficulties with that article transporting vehicle, then conventionally, a control means that controls two article transporting vehicles determines that the two article transporting vehicles are capable of traveling over the travel route as long as the connecting means is not connected to the connected member of either of the article transporting vehicles, which is determined from information detected by the connection detection means. When the connecting means is connected to the connected member of one of the article transporting vehicles positioned in the retrieval location, the control means determines that although that article transporting vehicle is not capable of moving, the other article transporting vehicle can traveling along the travel route. Further, when it is determined that the two article transporting vehicles can run along the travel route, then the control means controls the operation of the two article transporting vehicles that are capable of running along the travel route such that they do not collide, and when the connecting means is connected to the connected member of an article transporting vehicle positioned in the retrieval location, the control means controls the operation of the one article transporting vehicle that can run along the travel route such that it can move over the entire range of the travel route (see JP 2003-267518A, for example).

However, with the conventional transport apparatus described above, whether or not the article transporting vehicles other than those positioned at the retrieval location can run over the travel route is determined based on the detection information of the connection detection means, which is obtained through connection of the article transporting vehicle that is positioned in the retrieval location and the retrieval location by the connection means. Therefore, if damage to or misdetection by the connection detection means leads to the article transporting vehicle that is positioned at the retrieval location being detected as connected to the retrieval location even though it is not connected, then the control means determines that the article transporting vehicle that is located on the travel route is located at the retrieval location, creating a risk that that the article transporting vehicle that is located on the travel route but that has been determined to be located at the retrieval location will collide with the article transporting vehicle.

SUMMARY OF THE INVENTION

It is an object of the present invention to provide a transport apparatus that can accurately determine whether or not an article transporting vehicle is positioned in an retrieval location and thereby avoid collisions between article transporting vehicles.

The transport apparatus according to the invention comprises: a travel route having a plurality of retrieval locations that are continuous with the travel route; a plurality of article transporting vehicles that move along the travel route; control means for managing the plurality of article transporting vehicles; and connecting means, for each retrieval location, for selective That is, if all of the plurality of article transporting vehicles are capable of moving, then the detachable members are coupled to each article transporting vehicle and the connecting members are not connected to the connected members of the article transporting vehicles. If one of the article transporting vehicles is to be evacuated to an retrieval location for the purpose of maintenance work or due to technical difficulties, then the detachable member is detached from the article transporting vehicle that is to be evacuated and is coupled to the coupled portion of an article transporting vehicle that is capable of moving over the travel route, and the connecting means is connected to the connected member of the article transporting vehicle that has been evacuated to the retrieval location in order to connect the article transporting vehicle that is positioned in the retrieval location to the fixed portion near the retrieval location through the connecting means. Thus, the article transporting vehicle that has been evacuated to the retrieval location is connected to the fixed portion and can no longer move along the travel route, and thus the article transporting vehicles other than those vehicle that have been positioned in the retrieval locations are capable of moving along the travel route.

In other words, the coupling detection means detects that the detachable member is removed from the article transporting vehicle that is to be evacuated and is coupled to the coupled portion of an article transporting vehicle that is capable of moving over the travel route, and the connection detection means detects the connection between the article transporting vehicle positioned in the retrieval location and that retrieval location through the connecting means. Based on the information detected by the coupling detection means and the information detected by the connection detection means, it is determined that the article transporting vehicles other than those positioned in the retrieval locations are capable of moving along the travel route. Thus, as long as the coupling detection means of the coupled portion of the article transporting vehicles that are capable of moving along the travel route do not detect a coupling with the detachable member provided in the article transporting vehicle positioned in the retrieval location, then the control means will not determine that the article transporting vehicles positioned on the travel route are positioned in an retrieval location, even if damage to or misdetection by the connection detection means leads to a detection result in which the article transporting vehicle that is positioned in the retrieval location is connected to the retrieval location by the connecting means even though they are not in fact connected, and thus it is possible to avoid collisions between article transporting vehicles due to unforeseen circumstances.

DETAILED DESCRIPTION OF PREFERRED EMBODIMENTS

Hereinafter, embodiments of the transport apparatus according to the present invention are described based on the drawings.

This transport apparatus can be utilized in an automated warehouse provided with article storage shelves, for example.

Figure 1:
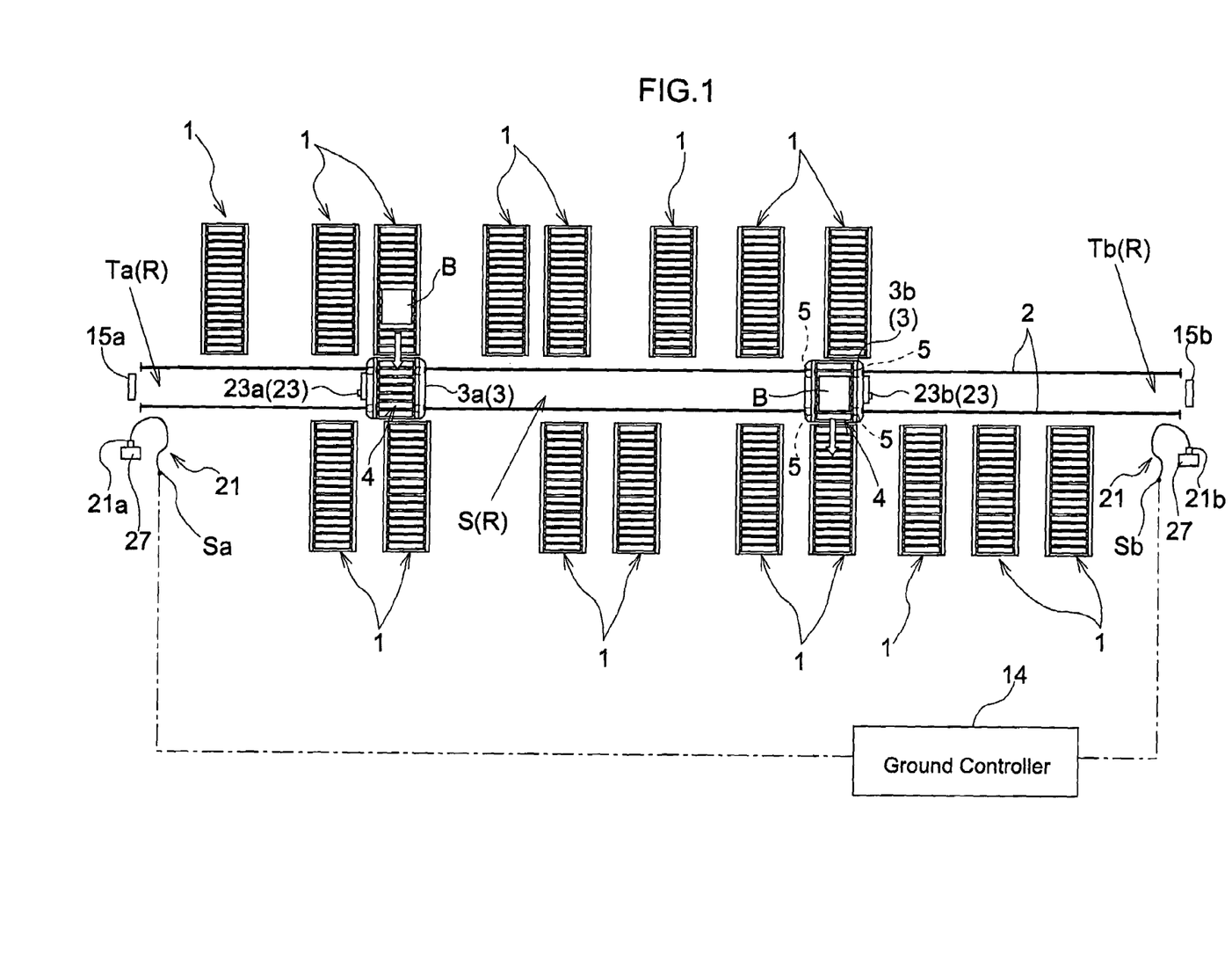
FIG. 1 is a plan view of the transport apparatus according to the present invention.

As shown in FIG. 1, a plurality of article handling vehicles 3a and 3b are provided as article transporting vehicles that travel along a path R that extends along a plurality of stations 1 functioning as article transferring locations. The plurality of article handling vehicles 3a and 3b travel back and forth over a travel route, transporting articles B between a plurality of stations.

The path R is a straight line having two end portions, and has a travel route S that is located in a central portion of the path R, and retrieval locations Ta and Tb that are in communication with the travel route S and located at both end portions of the path R and that are for evacuation of the article handling vehicles 3a and 3b. A plurality of stations 1 serving as article transferring locations are disposed on either side of the travel route S of the path R with a spacing between them in the lengthwise direction.

As for the plurality of stations, they include delivery stations 1 provided with a delivery conveyor for transporting articles B to be delivered from the article storage shelves, stocking stations 1 provided with a stocking conveyor for transporting articles B to be stocked in the article storage shelves, reception stations 1 provided with a reception conveyor for receiving articles B from the outside, and shipping stations 1 provided with a shipping conveyor for transporting articles B that are to be shipped to the outside.

Two vehicles are employed in the present embodiment, namely a first article handling vehicle 3a and a second article handling vehicle 3b. In the description that follows, if an "a" is attached to a number in the drawings, such as "22a", generally this means that the part is associated with the first article handling vehicle 3a, and similarly, if a "b" is attached to a number in the drawings, such as "22b", then generally this means that the part is associated with the second article handling vehicle 3b. The first article handling vehicle 3a and the second article handling vehicle 3b are each provided with an electrically powered transfer device 4, such as a roller conveyor that transfers the article B between that article handling vehicle 3 and a station 1, and running wheels 5 that roll over a running rail 2 having two ends arranged along the path R.

The running wheels 5 are made of drive running wheels 5 that are rotatively driven by an inverter-type travel motor 6, and driven running wheels 5 that can be rotatively driven.

Figure 2:
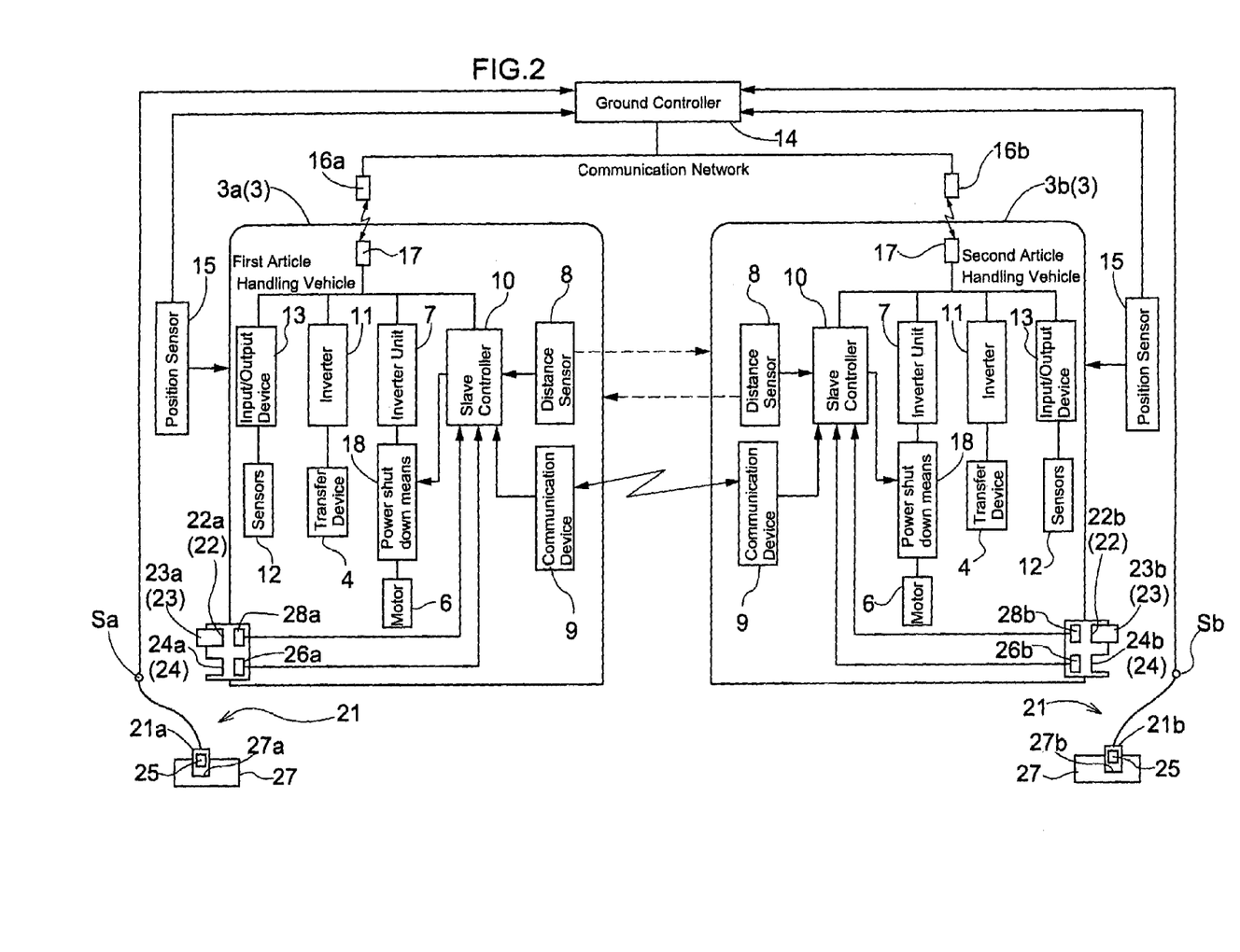
FIG. 2 is a control block diagram of the transport apparatus.

As shown in FIG. 2, the first article handling vehicle 3a and the second article handling vehicle 3b are each provided with a travel inverter 7 as travel driving means for operating the travel motor 6 to movably drive that article handling vehicle 3, a transfer inverter 11 that operates the transfer device 4, sensors 12 for detecting the state of the article B on the transfer device 4, for example, and an input-output device 13 for outputting the information detected by the sensors 12. The inverters 7 and 11 each have means for receiving data, a CPU that is separate from a slave controller that is described later, and a memory.

A single ground-side controller 14 (control means) for managing operation of the first article handling vehicle 3a and the second article handling vehicle 3b is provided on the ground (for example, the floor), and the first article handling vehicle 3a and the second article handling vehicle 3b are each provided with a vehicle-side optical transmission device 17 (vehicle-side communication means) that is capable of communicating with a control-side optical transmission device 16 (control-side communication means) that is provided in the ground-side controller 14. Through communication between the control-side optical transmission device 16 and the vehicle-side optical transmission device 17, the ground-side controller 14 controls the travel inverter 7 and the transfer inverter 11 of the first article handling vehicle 3a and the second article handling vehicle 3b, thereby managing movement of the first article handling vehicle 3a and the second article handling vehicle 3b.

Position detection sensors 15a and 15b (position detection means) that detect the position of the article handling vehicles 3 on the path R by detecting the distance to the article handling vehicles 3, are provided on extensions of the path R near the end portions of the retrieval locations Ta and Tb. The information detected by the position sensors 15a and 15b is input to the ground-side controller 14 wirelessly or via a hard wire connection. Any position sensor that utilizes sound waves or electromagnetic waves, including existing laser distance measurement devices, may be used as the position sensors 15a and 15b.

In this way, the ground-side controller 14 manages the position of the first article handling vehicle 3a and the second article handling vehicle 3b on the path R. The ground-side controller 14 stores mapping information necessary for determining the position of the vehicles 3a and 3b through information from the position detection sensors 15. Moreover, the ground-side controller 14 furnishes various command information to the first article handling vehicle 3a and the second article handling vehicle 3b, via a communication network that is for example made of the control-side optical transmission devices 16a and 16b for sending and receiving information between the ground-side controller 14 and the first article handling vehicle 3a and the second article handling vehicle 3b, and the vehicle-side optical transmission devices 17 used for sending and receiving information between the ground-side controller 14 and the article handling vehicles 3. In this way, the ground-side controller 14 manages the operation of the first article handling vehicle 3a and the second article handling vehicle 3b.

The ground-side controller 14 can operate in a 2-vehicle control mode for managing the operation of the two article handling vehicles 3 positioned on the travel route S based on information detected by the position detection sensors 15a and 15b in such a manner that they do not collide, and in a 1-vehicle control mode for managing a single article handling vehicle 3 positioned on the travel route S in such a manner that the article handling vehicle 3 can move over the entire range of the travel route S.

In the 2-vehicle control mode, the ground-side controller 14 overlaps the travel ranges of the two article handling vehicles 3 and manages the operation of the two article handling vehicles 3 so that the two article handling vehicles 3 each can transfer articles to every station 1. In the 2-vehicle control mode, the ground-side controller 14 manages the operation of the two article handling vehicles 3a and 3b such that they do not collide by performing a transport operation of transferring an article B between a station 1 for transfer and either one the first article handling vehicle 3a or the second article handling vehicle 3b, and an assigning operation of selecting and assigning an article handling vehicle of the first article handling vehicle 3a and the second article handling vehicle 3b that is to perform the transport operation, in accordance with transport request data specifying a station 1 for transfer from among the plurality of stations and the positional information of the two article handling vehicles 3a and 3b detected by the position detection sensors 15a and 15b.

Figure 3:
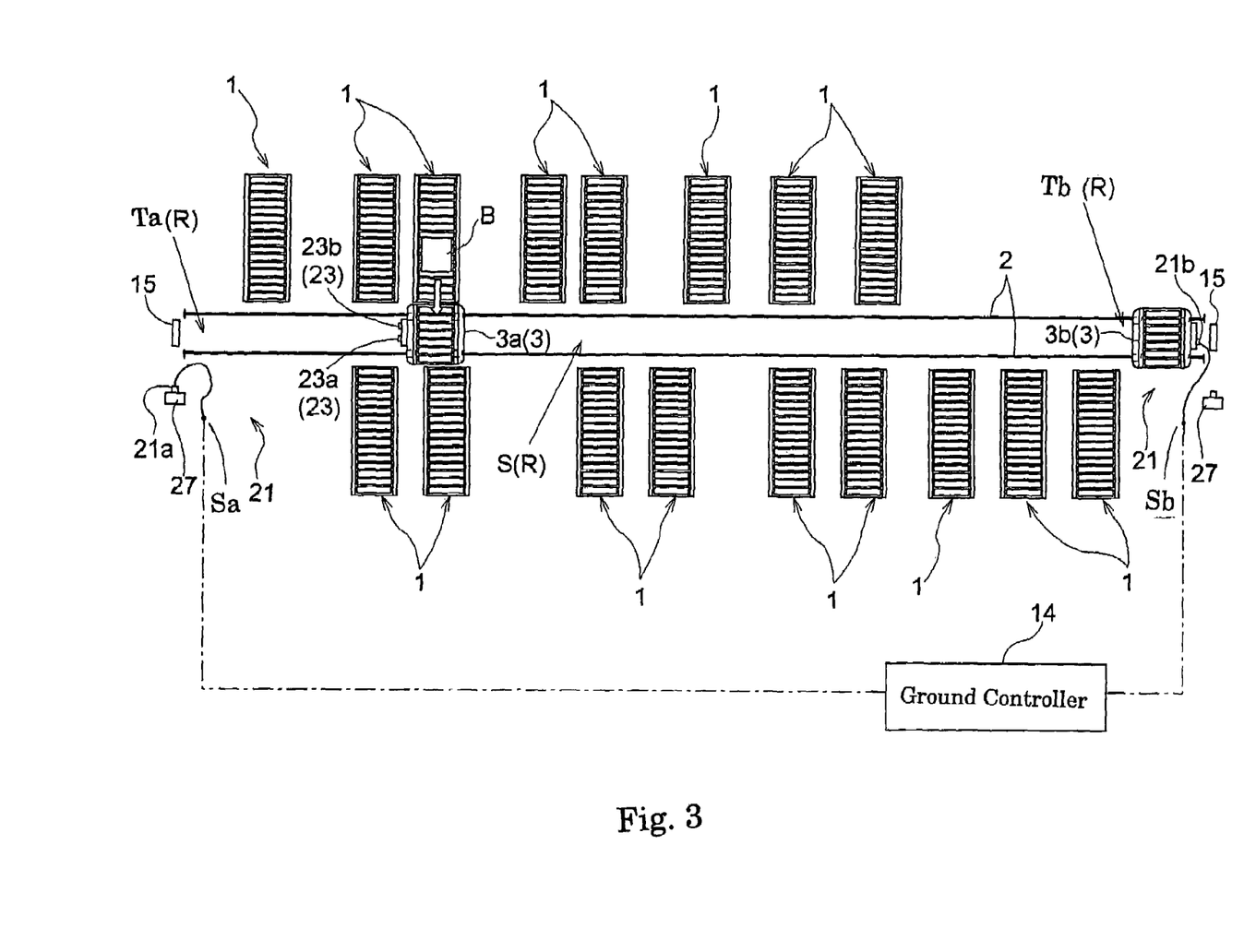
FIG. 3 is a plan view of the transport apparatus, indicating a state in which one vehicle is on standby at a standby location.

In the 1-vehicle control mode, as shown in FIG. 3, when one of the article handling vehicles (for example, 3a) has been evacuated to the retrieval location due to a breakdown or for maintenance work, the ground-side controller 14 controls operation of the other article transporting vehicle 3b so that it moves over the entire travel range S in order to perform all of the transport operations with the article transporting vehicle 3b without performing the assigning operation.

With regard to the transport request data, transport request data that specify a station 1 for transfer with which stocking, delivering, reception or shipping is to be performed are input to the ground-side controller 14 by a manually operated input device, such as a keyboard, or by a host computer.

The ground-side controller 14 treats the receiving transport operation for moving the assigned article handling vehicle 3 to the station 1 for transfer to carry out delivery or reception for receiving the article B, and the delivering transport operation for moving the article handling vehicle 3, after it has performed the receiving transport operation, to a station 1 for transfer to carry out stocking or shipping in order to deliver the article B, as separate transport operations.

To describe the assigning operation more specifically, the ground-side controller 14 selects and assigns which article handling vehicle 3a or 3b, of the first article handling vehicle 3a and the second article handling vehicle 3b, is appropriate for performing the transport operation based on various conditions such as whether it is the receiving transport operation or the delivering transport operation that is to be performed, whether or not the first article handling vehicle 3a and the second article handling vehicle 3a are currently performing a transport operation, and where the article handling vehicle 3a and the article handling vehicle 3b are positioned on the path R.

That is to say, when the receiving transport operation is performed, if the two article handling vehicles 3 are both on standby and are not currently performing a transport operation, then the ground-side controller 14 specifies the article handling vehicle, of the first article handling vehicle 3a and the second article handling vehicle 3b, that is closest to the station 1 for transfer to be the article handling vehicle 3 that will perform the receiving transport operation.

Furthermore, when the two article handling vehicles 3a and 3b are an article handling vehicle that is currently performing a transport operation (for example, 3a) and an article handling vehicle 3b that is on standby, if the article handling vehicle 3b that is on standby will not interfere with the article handling vehicle 3a that is currently performing the transport operation if it performs the receiving transport operation, then the ground-side controller 14 specifies the article handling vehicle 3b that is on standby as the vehicle to perform the receiving transport operation.

When performing the delivering transport operation, if the article handling vehicle 3b other than the article handling vehicle (for example, 3a) that performed the receiving transport operation is on standby, then the ground-side controller 14 specifies the article handling vehicle 3a that performed the receiving transport operation as the article handling vehicle 3a that will perform the delivering transport operation.

Furthermore, if the article handling vehicle 3b other than the article handling vehicle (for example, 3a) that performed the receiving transport operation is currently performing a transport operation, then the ground-side controller 14 specifies the article handling vehicle 3a that performed the receiving transport operation as the vehicle with which to perform the delivering transport operation, at a time when the article handling vehicle 3a that performed the receiving transport operation will not interfere with the other one article handling vehicle 3b that is currently performing the transport operation if it performs the delivering transport operation.

In this way, the ground-side controller 14, by performing the assigning operation, assigns an article handling vehicle to perform the receiving or delivering transport operation in the order that the transport request data are generated, so as to satisfy the transport request data that are generated without interfering with the article handling vehicle that is currently performing the transport operation.

In the assigning operation, the ground-side controller 14 keeps the other article handling vehicle on standby at its current location in a standby state without specifying it as an article handling vehicle for a transport operation if the other article handling vehicle will interfere with the article handling vehicle that is currently performing the transport operation.

When moving the article handling vehicle 3$a$ for performing the delivering transport operation to the station 1 for transfer in order to perform stocking or shipping to deliver the article B, if the other article handling vehicle 3$b$ is in the way of the article handling vehicle 3$a$ currently performing the transport operation due to being on standby on the travel route, then the ground-side controller 14 executes a drive out operation to move the other article handling vehicle 3$b$ to a position where it is not in the way.

It should be noted that when performing the drive out operation, if the first article handling vehicle 3$a$ is to deliver the article B to the rightmost station 1 in FIG. 1, for example, then the ground-side controller 14 performs the drive out operation with respect to the second article handling vehicle 3$b$, in this case driving out the second article handling vehicle 3$b$ to the retrieval location Tb.

As shown in FIG. 2, the first article handling vehicle 3$a$ and the second article handling vehicle 3$b$ each is provided with a vehicle distance sensor 8 serving as a distance detection means for detecting the distance between vehicles, a vehicle-to-vehicle optical transmission device 9 (vehicle-to-vehicle communication means) for communicating information between the vehicles, and a slave controller 10 (vehicle-to-vehicle control device) that performs approach prohibit control and approach allow control based on the information detected by the vehicle distance sensor 8 in order to control the operation of the article handling vehicles so that they do not collide. That is, by performing approach prohibit control while the ground-side controller 14 is in the 2-vehicle control mode, it is possible to manage the operation of the article handling vehicles 3$a$ and 3$b$ so that they do not come into contact with each other even if the article handling vehicles 3$a$ and 3$b$ cannot be controlled normally due to a technical problem with the ground-side controller 14. Further, by performing approach allow control while the ground side controller 14 is in the 1-vehicle control mode, the first article handling vehicle 3$a$ is not able to travel to the end portion of the travel route S due to approach prohibit control with respect to the second article handling vehicle 3$b$ positioned in the retrieval location Tb in FIG. 1 and FIG. 3.

To describe the approach prohibit control, the slave controllers 10 monitor the relative distance and the relative speed between the article handling vehicles based on information detected by the vehicle distance sensors 8, and control operation of the article handling vehicles 3$a$ and 3$b$ so that they do not collide by forcibly stopping both article handling vehicles 3$a$ and 3$b$ if there is a possibility that they will collide.

That is to say, if the relative distance between vehicles is equal to or less than an allowable distance between vehicles, or if the relative speed is equal to or greater than an allowable relative speed, then the slave controllers 10 stop movement of the article handling vehicles 3 by activating power stopping means 18 for stopping the supply of power to the travel motors 6 in order to stop the supply of power to the travel motors 6.

It should be noted that although it is possible to forcibly stop both of the two article handling vehicles 3$a$ and 3$b$ if the relative distance between vehicles is equal to or less than the allowable relative distance between vehicles, or if the relative speed is equal to or greater than the allowable relative speed, by executing approach prohibit control in each of the two article handling vehicles 3$a$ and 3$b$ as described above, a configuration in which the detected information is transmitted from the second article handling vehicle 3$b$ using the vehicle-to-vehicle optical transmission device 9, and the power stopping means 18 is activated based on this detected information that has been transmitted by the optical vehicle-to-vehicle transmission device, has been adopted taking into consideration a situation where the vehicle distance sensor 8 provided in the first article handling vehicle 3$a$ breaks down, for example.

As shown in FIG. 1 to FIG. 3, the retrieval location Ta is provided with the first article handling vehicle 3$a$ positioned in the retrieval location Ta, connecting means 21 capable of connecting to a fixed portion Sa that is provided in the vicinity of the retrieval location Ta, and a holding terminal 27 that is capable of connecting to the connecting means 21. Similarly, the retrieval location Tb is provided with the second article handling vehicle 3$b$ located in the retrieval location Tb, connecting means 21 capable of connecting to a fixed portion Sb of the retrieval location Tb, and a holding terminal 27 that is capable of connecting to the connecting means 21. Each of the first article handling vehicle 3$a$ and the second article handling vehicle 3$b$ has a connector socket 22 (connected member) that can be coupled with the connecting means 21, a removable plug 23 (detachable member), and an attachment socket 24 (attaching member) that can be coupled with the removable plug 23 of the other article handling vehicle. That is, the removable plug 23$a$ of the first article handling vehicle 3$a$ can be attached to the connector socket 22$a$ of the first article handling vehicle 3$a$, and the removable plug 23$b$ of the second article handling vehicle 3$b$ can be attached to the connector socket 22$b$ of the second article handling vehicle 3$b$. Also, the removable plug 23$b$ of the second article handling vehicle 3$b$ can be coupled with the attachment socket 24$a$ of the first article handling vehicle 3$a$, and the removable plug 23$a$ of the first article handling vehicle 3$a$ can be coupled with the attachment socket 24$b$ of the second article handling vehicle 3$b$. The removable plugs 23$a$ and 23$b$ have one or more pins that are matched to one or more holes formed in the corresponding sockets 24$a$ and 24$b$. For the removable plug 23$a$ and the removable plug 23$b$, it is preferable that the position, size, and/or the physical characteristics, including electrical characteristics such as resistance, of their pins are different. The connecting means 21 of the retrieval location Ta is configured so that it can selectively connect the holding terminal 27 to the fixed portion Sa shown in FIG. 4A, or the article handling vehicle 3$a$ to the fixed portion Sa shown in FIG. 4B. The connecting means 21 of the retrieval location Tb is configured so that it can selectively connect the holding terminal 27 to the fixed portion Sb shown in FIG. 4A, or the article handling vehicle 3$b$ to the fixed portion Sa shown in FIG. 4B. Each connecting means 21 has a front end portion that has one or more of connector pins for coupling with the connector socket 22$a$, and a wire of which one end is connected to the connector pins and the other end is fastened to the respective fixed portion Sa or Sb.

The connecting means 21 are provided with a connection detection sensor 25 (connection detection means) that detects whether or not the article handling vehicles 3$a$ and 3$b$ and the corresponding fixed portions Sa and Sb are connected. The connector socket 22$a$ of the first article handling vehicle 3$a$ is provided with an own plug detection sensor 28 for detecting whether or not its removable plug 23$a$ is in a coupled state, and the connector socket 22b of the second article handling vehicle 3b is provided with an own plug detection sensor 28 for detecting whether or not its removable plug 23b is in a coupled state (see FIG. 4A, FIG. 4B and FIG. 4C). It is preferable that these connection detection sensors and plug detection sensors are limit sensors. They may be of the type provided with circuits that are closed by engagement with one or more pins provided on the corresponding plugs. Other conventional sensors may also be used instead. Furthermore, the attachment socket 24a of the first article handling vehicle 3a is provided with a remote vehicle plug detection sensor 26 as coupling detection means that detects whether or not the removable plug 23b of the other article handling vehicle 3b is coupled, and the attachment socket 24b of the first article handling vehicle 3b is provided with a remote vehicle plug detection sensor 26 as coupling detection means that detects whether or not the removable plug 23a of the other article handling vehicle 3a is coupled. It should be noted that the connection detection sensor 25 is configured so that it can also detect whether or not the connecting means 21 is connected to the holding terminal 27.

The connecting means 21 is described in further detail. As shown in FIG. 1 and FIG. 2, the retrieval location Ta of the first article handling vehicle 3a is provided with the connecting means 21, one end of which is always connected to the fixed portion Sa and the other end of which is provided with a first connection plug 21a that is capable of coupling with a first connector socket 22a provided in the first article handling vehicle 3a, and the retrieval location Tb of the second article handling vehicle 3b is provided with the connecting means 21, one end of which is always connected to the fixed portion Sb and the other end of which is provided with a second connection plug 21b that is capable of coupling with a second connector socket 22b provided in the second article handling vehicle 3b.

Each of the connecting means 21 is sufficiently long to connect the fixed portions Sa and Sb to the corresponding article handling vehicle 3a or 3b while that article handling vehicle 3a or 3b is positioned in the evacuation station Ta and Tb, but is not long enough to connect the fixed portion Sa and Sb to the article handling vehicle 3a and 3b when even some of the article handling vehicle 3a or 3b protrudes from the retrieval location Ta and Tb in the travel route S.

The first connecting plug 21a and the second connecting plug 21b are each provided with the connection detection sensor 25, which outputs detected information to the ground-side controller 14, and when the first connecting plug 21 a is coupled to the first connector socket 22a, or when the second connecting plug 21b is coupled to the second connector socket 22b, that connection with the connector socket 22 is detected by the connection detection sensor 25, and that detected information is output to the ground-side controller 14.

The retrieval location Ta for the first article handling vehicle 3a is provided with a holding terminal 27 that has a first holding socket 27a capable of coupling with the first connecting plug 21a of the connecting means 21, and the retrieval location T for the article handling vehicle 3b is provided with a holding terminal 27 that has a second holding socket 27b capable of coupling with the second connecting plug 21b of the connecting means 21. If the connecting means 21 is not connected to the article handling vehicle 3a or 3b, then the first connector plug 21a or the second connector plug 21b of the connecting means 21 will be coupled to the corresponding holding socket 27.

When the first connector plug 21a is coupled to the first holding socket 27a, or when the second connector plug 21b is coupled to the second holding socket 27b, this connection with the holding terminal 27 is detected by the connection detection sensors 25, and this detected information is output to the ground-side controller.

Figure 4:
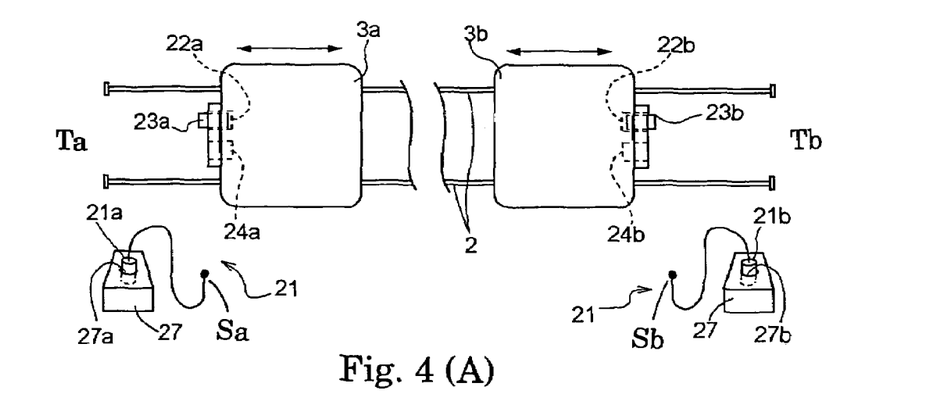
FIG. 4 is a diagram of the switching action between a 2-vehicle control mode and a 1-vehicle control mode of the transport apparatus.

The connector sockets 22a and 22b are described next. As shown in FIG. 2 and FIG. 4, the first removable plug 23a can be freely coupled to and detached from the first connector socket 22a provided in the first article handling vehicle 3a, and the second removable plug 23b can be freely coupled to and detached from the second connector socket 22b provided in the second article handling vehicle 3b.

The first connector socket 22a and the second connector socket 22b are each provided with the own plug detection sensor 28 for outputting detection information to the slave controller 10, and by coupling the first removable plug 23a to the first connector socket 22a or coupling the second removable plug 23b to the second connector socket 22b, the remote vehicle plug detection sensor 26 detects that its own vehicle's removable plug 23 has been connected, and outputs this detected information to the slave controller 10.

As described above, the first article handling vehicle 3a is provided with the first attachment socket 24a that is capable of coupling with the second removable plug 23b of the second article handling vehicle 3b, and the second article handling vehicle 3b is provided with the second attachment socket 24b that is capable of coupling with the first removable plug 23a of the first article handling vehicle 3b, as shown in FIG. 2 and FIG. 4.

The first attachment socket 24a and the second attachment socket 24b are each provided with the remote vehicle plug detection sensor 26 to output the information that is detected to the ground-side controller 14, and through coupling of the first removable plug 23a to the first connector socket 24a or coupling of the second removable plug 23b to the second connector socket 22b, the remote vehicle plug detection sensor 26 detects that its own vehicle's removable plug 23 has been connected, and inputs this detected information to the slave controller 10.

Based on the information detected by the remote vehicle plug detection sensor 26, the slave controller 10 performs the approach prohibit control when the removable plug 23 of the other article handling vehicle 3 is not coupled to the attachment socket 24, and performs the approach allow control when the removable plug 23 of the other article handling vehicle 3 is coupled to the attachment socket 24. Put differently, when no detected information is input from the remote vehicle plug detection sensor 26, the slave controllers 10 determine that the removable plug 23 of the other article handling vehicle 3 is not coupled to the attachment socket 24 and perform approach prohibit control, and when detected information is received from the remote vehicle plug detection sensor 26, the slave controllers 10 determine that the removable plug 23 of the other article handling vehicle 3 is coupled to the attachment socket 24, and perform approach allow control. The information detected by the remote vehicle plug detection sensor 26 and the information detected by the own plug detection sensor 28 that is input into the slave controllers 10 is then output from the slave controllers 10 to the ground-side controller 14, and is input in the ground-side controller 14 via the communication network.

In order to determine whether all of the plurality of article handling vehicles 3a and 3b can move over the travel route S, or whether the article handling vehicles excluding those positioned in the retrieval locations can move over the travel route S, this determination is made by the ground-side controller 14 based on the information detected by the own plug detection sensors 28, in addition to the information detected by the connection detection sensors 25 and the information detected by the remote vehicle plug detection sensors 26.

Specifically, as shown in FIG. 4A, when neither of the attachment sockets 24a and 24b of the article handling vehicle 3a or 3b are coupled to the removable plug of the other article handling vehicle, removable plugs 23a and 23b are coupled to the connector sockets 22a and 22b of either of the article handling vehicle 3a or 3b, and the connecting means 21 is not connected to either of the holding terminals 27, then the ground-side controller 14 determines that all of the plurality of article handling vehicles 3 can run along on the travel route S.

As shown in FIG. 4B, when the connection member 21a is connected without the removable plug 23b of the remote vehicle being coupled to the attachment socket 24a of the article handling vehicle 3a positioned in the retrieval location Ta and without the removable plug 23a being coupled to the connector socket 22a of the article handling vehicle 3a positioned in the retrieval location Ta, and the removable plug 23b is coupled to the connector socket 22b of an article handling vehicle 3b that is capable of moving along the travel route S, the removable plug 23a of the other vehicle is connected to the attachment socket 24b, and the connecting means 21 corresponding to the article handling vehicle 3b that is capable of running along the travel route is connected to the holding terminal 27, then the ground-side controller 14 determines that the article handling vehicle 3b, excluding that vehicle positioned in the retrieval location Ta, is capable of traveling along the travel route S. As shown in FIG. 4C, when the connection member 21a is connected without the removable plug 23a of the remote vehicle being coupled to the attachment socket 24b of the article handling vehicle 3b positioned in the retrieval location Tb and without the removable plug 23b being coupled to the connector socket 22b of the article handling vehicle 3b positioned in the retrieval location Tb, and the removable plug 23a is coupled to the connector socket 22a of an article handling vehicle 3a that is capable of moving along the travel route S, the removable plug 23b of the other vehicle is connected to the attachment socket 24a, and the connecting means 21 corresponding to the article handling vehicle 3a that is capable of running along the travel route is connected to the holding terminal 27, then the ground-side controller 14 determines that the article handling vehicle 3a, excluding that vehicle positioned in the retrieval location Tb, is capable of traveling along the travel route S.

When the ground-side controller 14 determines that all of the plurality of the article handling vehicles 3a and 3b can move along the travel route S, it performs control in the 2-vehicle control mode, and when the ground-side controller 14 determines that the article handling vehicle 3a or 3b, excluding the vehicle positioned in the retrieval location Ta or Tb, can move along the travel route S, it performs control in the 1-vehicle control mode.

That is, when the ground-side controller 14 has received detection information from the two detection sensors 28, and has received detection information regarding connection with the holding terminals 27 from the two connection detection sensors 25 without receiving detection information from the two remote vehicle plug detection sensors 26, then the ground-side controller 14 determines that all of the plurality of article handling vehicles 3 are capable of moving along the travel route S, and performs control in the 2-vehicle control mode.

Furthermore, when the ground-side controller 14 has received detection information from one of the detection sensors 28 and remote vehicle plug detection sensors 26, has not received detection information from the detection sensor 28 and the remote vehicle plug detection sensor 26 of the other article handling vehicle 3, has received detection information that is output due to connection with the holding terminal 27 from one of the connection detection sensors 25, and has received detection information that is output due to connection with an article handling vehicle from the other connection detection sensor 25, the ground-side controller 14 determines that the article handling vehicle 3a or 3b other than that vehicle located in the retrieval location Ta or Tb is capable of moving along the travel route S, and performs control in the 1-vehicle control mode.

It should be noted that if it has not determined whether or not all of the plurality of article handling vehicles are capable of moving along the travel route 2, or whether or not the article handling vehicles other than those vehicles positioned in the retrieval locations T are capable of moving along the travel route S, then the ground-side controller 14 cuts the main circuits of the two article handling vehicles to stop their operation.

Next, a switch from a state in which ground-state controller 14 controls the two article handling vehicles 3a and 3b to a state in which it is to control the remaining single vehicle after one of the vehicles has been evacuated to an retrieval location in order to perform maintenance work or due to a technical problem is described.

It should be noted that the method described below is only one example of a switchover method, and it is only necessary that the method is one for switching from the state shown in FIG. 4A to the states shown in FIG. 4B or FIG. 4C.

When controlling operation of the article handling vehicle 3a and the article handling vehicle 3b, that is to say, when the ground-side controller 14 is performing control in the 2-vehicle control mode, the first removable plug 23a is coupled to the first connector socket 22a of the first article handling vehicle 3a, the second removable plug 23b is coupled to the second connector socket 22b of the second article handling vehicle 3b, and the first connecting plug 21a and the second connecting plug 21b of the connecting means 21 are each coupled to the corresponding first holding socket 27a and the second holding socket 27b of the holding terminal 27, as shown in FIG. 4A.

If the first article handling vehicle 3a is to be evacuated to the retrieval location Ta, then first, the first removable plug 23a of the first article handling vehicle 3a is detached from the first connector socket 22a and is coupled to the second connector socket 22b of the second article handling vehicle 3b. By doing this, the main circuits of the two article handling vehicles 3 are cut, switching from approach prohibit control to approach allow control. Next, the first article handling vehicle 3a is moved to the retrieval location Ta, the first connecting plug 21a is removed from the first holding socket 27a and is coupled to the first connecting socket 21a of the first article handling vehicle 3a, thereby connecting the first article handling vehicle 3a to the fixed portion Sa by the connecting means 21. In this way, control is switched from the 2-vehicle control mode to the 1-vehicle control mode, and the main circuits of the two article handling vehicles are turned on.

Similarly, if the second article handling vehicle 3b is to be evacuated to the retrieval location Tb, then first, the second removable plug 23b of the second article handling vehicle 3b is detached from the second connector socket 22b and is coupled to the first connector socket 24a of the first article handling vehicle 3a. By doing this, the main circuits of the two article handling vehicles 3 are cut, switching from approach prohibit control to approach allow control. Next, the second article handling vehicle 3b is moved to the retrieval location Tb, the second connecting plug 21b is removed from the second holding socket 27b and is coupled to the second connecting socket 21b of the second article handling vehicle 3b, thereby connecting the second article handling vehicle 3b to the fixed portion Sb by the connecting means 21. In this way, control is switched from the 2-vehicle control mode to the 1-vehicle control mode, and the main circuits of the two article handling vehicles are turned on.

Other Embodiments (1) In the aforementioned embodiment, the article transporting vehicles 3a and 3b are each provided with distance detection means 8 and a vehicle-to-vehicle control device 10, and the operation of the two article transporting vehicles 3 is controlled by the control means 14 and the vehicle-to-vehicle control device 10. However, it is also possible to control the operation of the two article transporting vehicles with only the control means 14, without providing the vehicle-to-vehicle distance control device 10.

(2) In the aforementioned embodiment, the distance detection means 8 is provided in each of the article transporting vehicles 3, but it is also possible to adopt a configuration in which the distance detection means 8 is provided in only one of the article transporting vehicles 3.

That is, it is possible to adopt a configuration in which each article transporting vehicle 3 is provided with the vehicle-to-vehicle control device 10 and the vehicle-to-vehicle transmission means 9 for communicating information with the other article transporting vehicle, one of the two article handling vehicles is provided with the distance detection means 8, and the detection information that is detected by the distance detection means 8 in that one article transporting vehicle is input to the vehicle-to-vehicle control device 10 of the other article transporting vehicle using the vehicle-to-vehicle transmission means 9.

(3) In the aforementioned embodiment, the control means 14 is constituted by a single ground-side controller for integrated management of the plurality of article transporting vehicles. However, it is also possible to achieve the control means 14 by providing a vehicle-side controller in each of the plurality of article transporting vehicles and through these achieve the control means 14, or to achieve the control means 14 through a plurality of vehicle-side controllers and the ground-side controller.

(4) In the aforementioned embodiment, article transferring locations 1 are disposed alongside the travel route S, and when performing control in the 1-vehicle control mode, it is possible to transfer the article B to all of the article transferring locations 1 using a single article transporting vehicle whose operation is managed. However, it is also possible to provide an article transferring location beside each retrieval location Ta and Tb that is dedicated for the article transporting vehicle 3 that is to be evacuated to that retrieval location.

That is to say, it is possible to adopt a configuration wherein both the 2-vehicle control mode and the 1-vehicle control mode it is possible to transfer the article B to and from an article transferring location 1 provided beside the travel route S and one of the retrieval locations (for example Ta) using one of the article transporting vehicles (for example 3a), and with the other article transporting vehicle 3b, to transfer an article B to and from an article transferring location 1 provided beside the travel route S and the other retrieval location Tb.

(5) In the aforementioned embodiment, in the 2-vehicle control mode, operation of the two article transporting vehicles 3 is controlled such that the travel ranges of the two article transporting vehicles 3 overlap and each of the two article transporting vehicles 3 is able to transfer articles B to every article transferring location. However, it is also possible to adopt a configuration in which in the 2-vehicle control mode, the travel ranges of the two article transporting vehicles do not overlap and thus only one of the article transporting vehicles 3 can transfer an article B to the article transferring stations 1, and in the 1-vehicle control mode, the article B can be transferred to and from every article transferring location 1 positioned alongside the travel route S through the article transporting vehicle 3 whose operation is controlled.

(6) In the aforementioned embodiment, position detection sensors are provided on each outer side end portion of the retrieval locations T as position detection means 15, and these detect the position of the article transporting vehicles 3 on the travel route S by detecting the distance to the article transporting vehicle 3. However, it is also possible to provide encoders as position detection means in each of the two article transporting vehicles 3 and to detect the position of the article transporting vehicles 3 on the travel route S based on the information detected by the encoders, and to communicate that detected information to the control device 14 through communication between the vehicle-side communication means 17 and the control-side communication means 18.

(7) In the aforementioned embodiment, the transport apparatus is configured such that when determining whether or not all of the plurality of article handling vehicles are capable of moving along the travel route S, or whether or not the article handling vehicles, excluding those vehicles positioned in the retrieval locations Ta or Tb, are capable of moving along the travel route S, this determination is made based on information detected by the connection detection means 25, information detected by the coupling detection means 26, and information detected by the own plug detection sensors 28. However, it is also possible to adopt a configuration in which this determination is made using the information detected by the connection detection means 25 and the information detected by the coupling detection means 26.

(8) In the aforementioned embodiment, two article transporting vehicles are provided as the plurality of article transporting vehicles, but it is also possible to provide three or more vehicles. For example, when three vehicles are utilized, these vehicles would share one travel route R. The system may be provided with a temporary route section that can be accessed by one of the vehicles from the travel route R so as to allow two vehicles to exchange their positions in the travel route R. It is also within the scope of the invention that the number of the attachment sockets may be increased depending on the number of vehicles utilized so as to receive all the removable plugs from other vehicles.

(9) In the aforementioned embodiment, the article handling vehicles serve as examples of the article transporting vehicles, but as the article transporting vehicles it is also possible to employ stacker cranes that are capable of transferring articles to and from article storage shelves that function as article handling locations, or to use other article transporting vehicles.

What is claimed is:

1. A transport apparatus, comprising:
 a travel route having a plurality of retrieval locations that are continuous with the travel route;
 a plurality of article transporting vehicles that move along the travel route;
 control means for managing the plurality of article transporting vehicles; and
 connecting means, for each retrieval location, for selectively connecting one of the article transporting vehicles to a fixed portion provided near the retrieval location, the connecting means provided with connection detection means for detecting whether or not one of the article transporting vehicles and the fixed portion are connected;

wherein each article transporting vehicle is provided with:

connected members that are capable of connecting to the connecting means;

vehicle-side communication means for communicating with control-side communication means provided in the control means;

a detachable member that can be freely attached to and detached from each of the article transporting vehicles; and a coupled portion that can be coupled with the detachable member of another article handling vehicle, and that is provided with coupling detection means for detecting whether or not the detachable member of another article transporting vehicle has been coupled thereto;

wherein the control means manages the plurality of article transporting vehicles through communication between the control-side communication means and the vehicle-side communication means;

wherein the control means, based on information detected by the connection detection means and information detected by the coupling detection means, determines that all of the plurality of the article transporting vehicles are allowed to move along the travel route in the case of a first state, in which the detachable member of one article transporting vehicle is not coupled to the coupled portion of any of the other article transporting vehicles, and the connecting means is not connected to the connected member of any of the article transporting vehicles; and determines that article transporting vehicles other than those vehicles that are positioned in the retrieval locations are allowed to move along the travel route in the case of a second state, in which the connecting means is connected to the connected member of the article transporting vehicle that is positioned in the retrieval location, and the detachable member of the article handling vehicle that is positioned in the retrieval location is coupled to the coupled portion of another article transporting vehicle.

2. The transport apparatus according to claim 1, wherein there are two article transporting vehicles;

wherein the transport apparatus further comprises position detection means for obtaining information necessary for determining the position of the two article transporting vehicles on the travel route;

wherein the control means, based on information detected by the position detection means, performs control in a 2-vehicle control mode of managing the two article transporting vehicles that are allowed to move along the travel route such that they do not collide, and in a 1-vehicle control mode of managing the one article transporting vehicle that is allowed to move along the travel route so that the one article transporting vehicle travels over substantially the entire range of the travel route; and wherein the control means performs control in the 2-vehicle control mode when in the first state, and performs control in the 1-vehicle control mode when in the second state.

3. The transport apparatus according to claim 1, further comprising:

in each article transporting vehicle, distance detection means for detecting a distance to other article transporting vehicles, and a vehicle-to-vehicle control device that performs approach prohibit control and approach allow control based on the information detected by the distance detection means, so as to manage the operation of the article transporting vehicle such that it does not collide with other article transporting vehicles;

wherein the vehicle-to-vehicle control device of a specific article transporting vehicle carries out the approach prohibit control when the detachable member of another article transporting vehicle is not coupled to the coupled portion, and carries out the approach allow control when the removable portion of another article transporting vehicle is coupled to the coupled portion, based on the detection information of the coupling detection means.

4. A transport apparatus comprising:

a travel route having a first end and a second end, wherein a first retrieval location is provided in a region of the first end of the travel route and a second retrieval location is provided in a region of the second end of the travel route;

a first article transporting vehicle and a second article transporting vehicle that move along the travel route;

control means for managing movement of the first article transporting vehicle and the second article transporting vehicle;

a first fixed portion provided near the first retrieval location;

a second fixed portion provided near the second retrieval location;

first connecting means for selectively connecting the first article transporting vehicle positioned in the first retrieval location with the first fixed portion, said first connecting means having first connection detection means for detecting whether or not the first article transporting vehicle and the first fixed portion are connected;

second connecting means for selectively connecting the second article transporting vehicle positioned in the second retrieval location with the second fixed portion, said second connecting means having second connection detection means for detecting whether or not the second article transporting vehicle and the second fixed portion are connected;

a first connected member that is provided in the first article transporting vehicle and that can connect to the first connecting means;

a second connected member that is provided in the second article transporting vehicle and that can connect to the second connecting means;

first vehicle-side communication means provided in the first article transporting vehicle for communicating with control-side communication means provided in the control means;

second vehicle-side communication means provided in the second article transporting vehicle for communicating with the control-side communication means provided in the control means;

a first detachable member that can be attached to and detached from the first article transporting vehicle and the second article transporting vehicle, and that corresponds to the first article transporting vehicle;

a second detachable member that can be attached to and detached from the first article transporting vehicle and the second article transporting vehicle, and that corresponds to the second article transporting vehicle;

a first coupled portion that is provided in the first article transporting vehicle, that can be coupled to the second detachable member, and that is provided with first coupling detection means for detecting whether or not the second detachable member is coupled; and a second coupled portion that is provided in the second article transporting vehicle, that can be coupled to the first detachable member, and that is provided with second coupling detection means for detecting whether or not the first detachable member is coupled;

wherein the control means controls movement of the first and the second article transporting vehicles through communication between the control-side communication means and the first and the second vehicle-side communication means;

wherein the control means, based on information detected by the connection detection means and information detected by the coupling detection means, also determines that both of the first and the second article transporting vehicles are allowed to move along the travel route in the case of a first state, in which the second detachable member is not coupled to the first coupled portion and the first detachable member is not coupled to the second coupled portion, and the first connecting means is not connected to the first connected member and the second connecting means is not connected to the second connected member; and determines that the second article transporting vehicle is allowed to move along the travel route in the case of a second state, in which the first connecting means is connected to the first connected member of the first article transporting vehicle positioned in the first retrieval location, and the first coupling member is coupled to the second coupled portion of the second article transporting vehicle.

5. The transport apparatus according to claim 4, further comprising:

position detection means for obtaining information necessary for determining the position of the first and the second article transporting vehicles on the travel route;

wherein the control means, based on information detected by the position detection means, can operate in a 2-vehicle control mode for managing the movement of the first and the second article transporting vehicles that can move along the travel route in such a manner that the article transporting vehicles do not collide, and in a 1-vehicle control mode for managing the operation of the one article transporting vehicle that can move along the travel route such that the one article transporting vehicle travels over substantially the entire range of the travel route; and wherein the control means operates in the 2-vehicle control mode in the case of the first state and operates in the 1-vehicle control mode in case of the second state.

6. The transport apparatus according to claim 5; further comprising:

in both the first and the second article transporting vehicles, distance detection means for detecting a distance between vehicles, and a vehicle-to-vehicle control device that performs approach prohibit control and approach allow control based on the information detected by the distance detection means, so as to manage the operation of the article transporting vehicle such that it does not collide with other article transporting vehicle;

wherein the vehicle-to-vehicle control device carries out the approach prohibit control when the detachable member of the other article transporting vehicle is not coupled to the coupled portion, and carries out the approach allow control when the removable portion of the other article transporting vehicle is coupled to the coupled portion, based on the detection information of the coupling detection means.

7. The transport apparatus according to claim 4, wherein the control-side communication means is an optical communication device.

* * * * *